J. P. GERAGHTY.
FENDER FOR AUTOMOBILES.
APPLICATION FILED NOV. 17, 1915.
1,191,957.
Patented July 25, 1916.
3 SHEETS—SHEET 2.
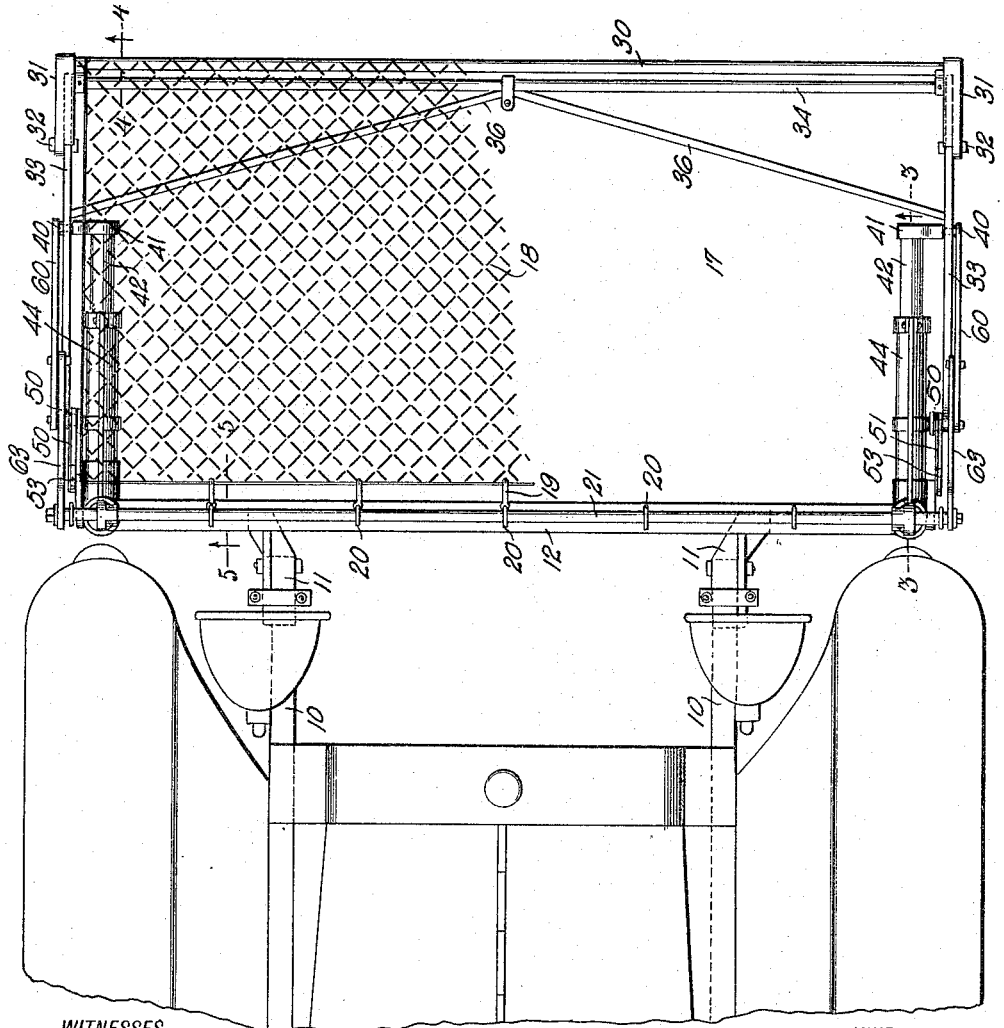
WITNESSES
INVENTOR
John P. Geraghty
BY
ATTORNEYS J. P. GERAGHTY.
FENDER FOR AUTOMOBILES.
APPLICATION FILED NOV. 17, 1915.
1,191,957.
Patented July 25, 1916.
3 SHEETS—SHEET 3.
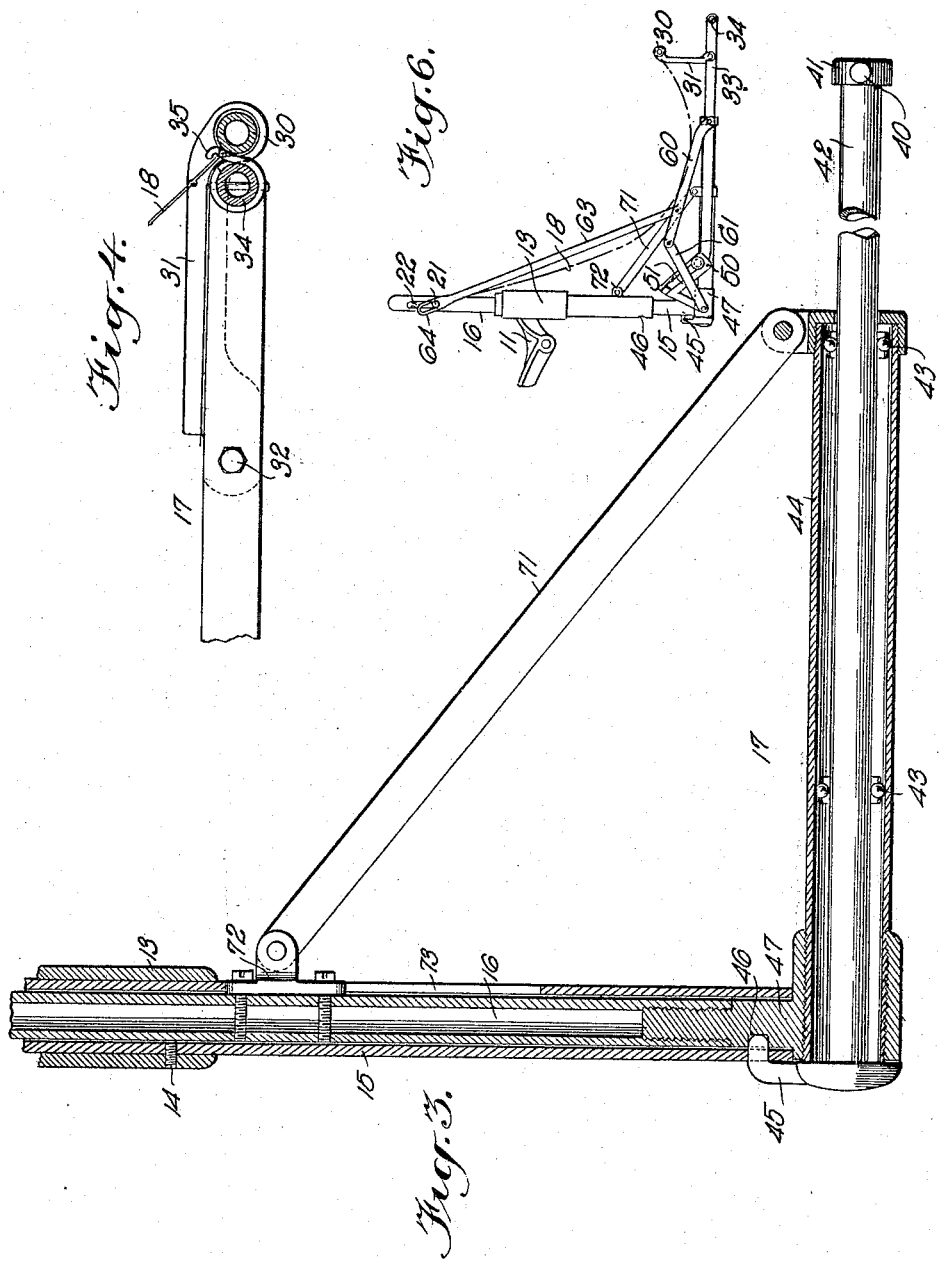
WITNESSES
INVENTOR
John P. Geraghty
BY
ATTORNEYS

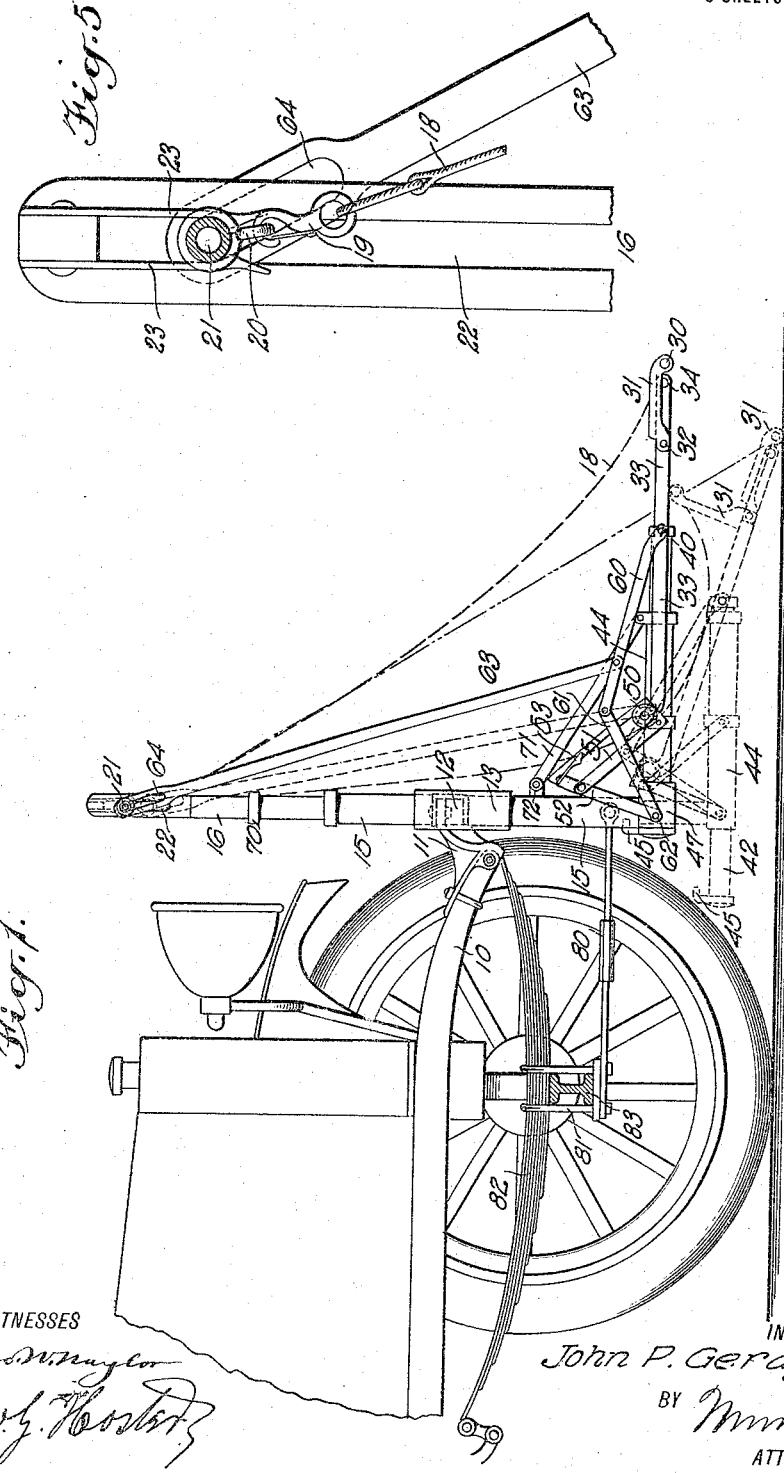

UNITED STATES PATENT OFFICE.

JOHN P. GERAGHTY, OF JERSEY CITY, NEW JERSEY.

FENDER FOR AUTOMOBILES.

1,191,957.          Specification of Letters Patent.     Patented July 25, 1916.

Application filed November 17, 1915. Serial No. 61,930.

*To all whom it may concern:*

Be it known that I, JOHN P. GERAGHTY, a citizen of the United States, and a resident of Jersey city, in the county of Hudson and State of New Jersey, have invented a new and Improved Fender for Automobiles, of which the following is a full, clear, and exact description.

The object of the invention is to provide a new and improved fender more especially designed for use on automobiles and other similar power-driven vehicles and arranged to normally hold the fender a considerable distance above the roadway to allow the fender to pass over ordinary obstacles, and to automatically drop, on a person or similar obstacle being struck by the fender, to safely pick up such obstacles and prevent the same from being run over and injured by the vehicle.

In order to accomplish the desired result, use is made of a vertical guideway fixed on the front end of the vehicle on which the fender is used, an apron, an apron frame carrying the apron and having a vertical section slidable in the said guideway and also having a normally horizontal section slidable on the said vertical section, the said horizontal section having releasing means normally holding the said vertical section locked in raised position and adapted to release the said vertical section when the front end of the horizontal section strikes an obstacle during the forward movement of the vehicle.

A practical embodiment of the invention is represented in the accompanying drawings forming a part of this specification, in which similar characters of reference indicate corresponding parts in all the views.

Figure 1 is a side elevation of the fender as applied to the front end of an automobile; Fig. 2 is a plan view of the same with a portion of the apron omitted; Fig. 3 is an enlarged sectional side elevation of a portion of the apron frame and its guideway, the section being on the line 3—3 of Fig. 2; Fig. 4 is an enlarged sectional side elevation of the forward end of the apron frame and apron, the section being on the line 4—4 of Fig. 2; Fig. 5 is an enlarged sectional side elevation of the upper end of the apron frame, the section being on the line 5—5 of Fig. 2; and Fig. 6 is a side elevation of the fender with the parts in position after an obstacle has passed into the apron.

On the front ends of the side beams 10 of the chassis of an automobile or similar power driven vehicle are secured brackets 11 to which is secured a cross beam 12 terminating at its ends in sleeves 13 in which are secured by screws 14 or other fastening devices vertically disposed tubular guideways 15, as plainly shown in Fig. 3. In the tubular guideways 15 are mounted to slide in a vertical direction upright bars 16 forming part of the apron frame 17 adapted to support the apron 18 of a suitable fabric material. The upper rear end of the apron 18 is provided with snap hooks 19 engaging rings 20 held on the cross bar 21 slidable vertically in guideways 22 formed on the upper ends of the upright bars 16 of the apron frame, the cross bar 21 being normally held in an uppermost position by springs 23 attached to the guideways 22, as plainly shown in Fig. 5. The lower forward end of the apron 18 is attached to a crossbar 30 secured at its ends to arms 31 pivoted at 32 to side arms 33 rigidly connected with each other at their forward ends by a crossbar 34 extending immediately in the rear of the crossbar 30. The crossbar 34 is provided with springs 35 engaging the crossbar 30 so as to normally hold the same in lowermost position, but the springs 35 release the crossbar 30 whenever an obstacle falls into the apron 18 and causes the arms 31 to swing upward, as indicated in dotted lines in Fig. 1, and as hereinafter more fully explained. It is understood that the crossbar 30 and its arms 31 form a guard which stands at a right angle to the swing frame formed of the side arms 33 and their crossbar 34 at the time the fender moves into the position shown in Fig. 1. The crossbar 34 is also connected with the side arms 33 by suitable braces 36 to form a comparatively rigid section of the apron frame, and which section extends normally in a horizontal direction, as indicated in Fig. 1. The side arms 33 are pivoted at 40 to heads 41 on the forward ends of rods 42 extending horizontally and mounted to slide on ball bearings 43 held in tubular bearings 44 attached to the lower ends of the bars 16, thus forming a fixed part of the vertical movable section of the apron frame. The rear ends of the rods 42 are provided with catches 45 extending through the backs of the guideways 15 and engaging recesses 46 formed in the lower ends 47 of the bars 16 so as to normally support this section of the apron frame in a raised position. When the rods 42 are moved rearwardly, as hereinafter more fully explained, then the catches 45 move out of engagement with the recesses 46 and away from the guideways 15 (see dotted lines in Fig. 1), and consequently allow the bars 16 to drop and with them the entire apron frame and the apron so that the apron frame moves from its normal raised position into lowermost position, as indicated in dotted lines in Fig. 1.

During the rearward movement of the rods 42, a swinging movement is given to the side arms 33 of the swing frame, and for this purpose the following arrangement is made: On the rear ends of the side arms 33 of the swing frame are journaled rollers 50 adapted to travel up on inclines 51 extending upwardly and rearwardly and secured at their lower ends to the bearings 44 and at their upper ends to brackets 52 attached to the ends 47 of the bars 16. Thus when the swing frame moves rearwardly the rollers 50 travel up the inclines 51 thus imparting a downward swinging motion to the swing frame, as plainly indicated in Fig. 1, so that the apron 18 is straightened out from the curved normal position indicated in Fig. 1. The upper ends of the brackets 52 are provided with spring catches 53 adapted to engage the peripheral faces of the rollers 50 to lock the same in uppermost position and thus hold the swing frame in the inclined position indicated in dotted lines in Fig. 1. When the parts are in this position the obstacle falling into the apron 18 exerts a pressure on the same to swing the guard formed of the crossbar 30 and side arms 31 into upward position, that is, practically at a right angle to the side arms 33 of the swing frame, as indicated in dotted lines in Fig. 1. Thus the apron assumes a scoop form and retains the obstacle, thereby preventing the latter from falling out of the apron.

The swing frame with its guard is returned to normal horizontal position during the time the apron frame drops into lowermost position and after the guard has assumed the angular position relative to the swing frame, as above mentioned. For this purpose the following arrangement is made: The side arms 33 are pivotally connected at the pivot 40 with toggle levers 60, normally extending rearwardly and upwardly and pivotally connected with toggle levers 61 fulcrumed at 62 on the ends 47 of the bars 16. The toggle levers 60 are pivotally connected with upwardly and rearwardly extending links 63 provided at their upper ends with slots 64 through which extends the crossbar 21 of the apron frame. When the cross bar 21 is held in uppermost position by the springs 23 then the crossbar is in the upper ends of the slots 64, and when the apron frame is released and drops, as previously explained, and the obstacle falls into the apron 18 then a sufficient pull is exerted on the cross bar 21 to pull the latter out from between the springs 23 so that the crossbar 21 slides down in the guideway 22. During the rearward movement of the swing frame the toggle levers 60, 61 are moved into closed position and in doing so the links 63 are moved upward so that the bottoms of the slots 64 engage the crossbar 21 and a further downward pull by the obstacle in the apron 18 on the crossbar 21 causes a downward movement thereof and consequently a downward movement of the links 63 to open the toggle levers 60, 61 whereby the swing frame 33, 34 together with the rods 42 is moved forward and the swing frame swings upward back into horizontal position, as indicated in Fig. 6. It is understood that during this forward movement of the swing frame and the rods 42, the rollers 50 travel down the inclines 51 to allow the side arms 33 of the swing frame to return to horizontal position.

From the foregoing it will be seen that by the arrangement described the entire apron frame drops so that its bottom is within a short distance of the roadway and the swing frame is returned to normal horizontal position so that none of the parts of the fender are in contact with the ground or roadway and hence the person or other obstacle in the apron 18 is not liable to strike the ground as the apron is held above the same.

The dropping movement of the apron frame is limited by collars 70 attached to the bars 16 a distance above the ends of the guideways 15 so that when the bars 16 are released and drop the downward movement thereof is limited by the collars 70 engaging the upper ends of the guideways 15. In order to strengthen the bearings 44 use is made of braces 71 connecting the forward ends of the bearings 44 with the bars 16 by the use of brackets 72 extending through slots 73 formed in the front of the guideways 15, as plainly indicated in Fig. 3. The guideways 15 are connected near their lower ends with rearwardly extending supporting links 80 attached to clips 81 used for holding the springs 82 to the axle 83, it being understood that the braces 80 aid the brackets 11 to hold the fender in position on the front wheel.

The operation is as follows: When the parts are in normal position, as shown in full lines in Fig. 1, then the bottom of the apron frame is a considerable distance above the roadway so that the fender can readily pass over the ordinary obstacles in the roadway. When the vehicle is running and the cross bar 30 of the guard strikes an obstacle then the horizontal section of the apron frame is pushed rearward and in doing so the catches 45 release the bars 16 of the vertical section of the fender so that the entire fender drops bodily until the collars 70 engage the upper ends of the guideways 15. During the rearward movement of the horizontal section of the fender, the side arms 33 of the swing frame are swung downward owing to the rollers 50 traveling up the inclines 51 so that the apron 18 becomes stretched, as indicated in dotted lines in Fig. 1, and the obstacle now falling against the apron causes the guard to swing upward into right angular position relative to the side arms 33 to form the apron into a pocket with a view to retain the obstacle. The weight of the obstacle in the apron pocket causes a downward pull of the crossbar 21 so that the latter is disengaged from the springs 23 and a downward movement is given to the links 63 to cause the horizontal section of the apron to slide forward and to cause the side arms 33 to swing upward back into horizontal position to hold the entire bottom section of the apron frame above the roadway, as indicated in Fig. 6. After the vehicle has come to a standstill and the obstacle has been removed from the apron 18, the several parts can be readily returned to normal position.

The fender shown and described can be readily attached to the front of an automobile or a similar power driven vehicle and it practically takes up comparatively little room. A person or other obstacle falling into the apron is not liable to come in contact with any part of the vehicle itself thus preventing injury to the obstacle.

Having thus described my invention, I claim as new and desire to secure by Letters Patent:

1. A fender for automobiles and similar power-driven vehicles, comprising an approximately vertical guideway on the front end of the vehicle on which the fender is used, an apron, an apron frame having an upright section, and an approximately horizontal section provided with a swing frame, the said apron being attached at its forward end to the forward end of the swing frame, and the rear end of the said apron being connected with the upper end of the said upright apron frame section, the latter being mounted to slide in the said guideway, the said horizontal section being normally held in forward position and being adapted to slide rearwardly on the upright section to release the latter to allow it to drop and to cause the spring frame to swing downward.

2. A fender, comprising a vertical guideway fixed on the front end of the vehicle on which the fender is used, an apron, an apron frame supporting the apron and having a vertical section slidable in the said guideway and a normally horizontal section slidable on the said vertical section, the said horizontal section having releasing means normally holding the said vertical section locked in raised position and releasing the said vertical section when the front end of the horizontal section strikes an obstacle during the forward movement of the vehicle.

3. A fender, comprising a vertical guideway fixed on the front end of the vehicle on which the fender is used, an apron, an apron frame carrying the said apron, the said apron frame having a vertical section provided with horizontal bearings, and a normally horizontal section bodily slidable in a rearward direction on the said bearings, the said horizontal apron section having a supporting and releasing means engaging the said vertical section to normally hold the latter in raised position and to release the said vertical section and allow it and with it the horizontal section to drop when the front end of the horizontal section strikes an obstacle during the forward movement of the vehicle.

4. A fender, comprising a vertical guideway fixed on the front end of the vehicle on which the fender is used, an apron, an apron frame carrying the said apron, the said apron frame having a vertical section provided with horizontal bearings, a normally horizontal section bodily slidable in a rearward direction on the said bearings, the said horizontal section having a swing frame provided with a pivoted guard to which the forward end of the apron is secured, a supporting and releasing means on the said horizontal section and engaging the said vertical section to normally support the latter in raised position and to allow the said vertical section to drop on the said guard striking an obstacle during the forward movement of the vehicle, and means for imparting a swinging movement to the said swing frame during the bodily rearward movement of the horizontal section.

5. A fender, comprising a vertical guideway fixed on the front end of the vehicle on which the fender is used, an apron, an apron frame carrying the said apron, the said apron frame having a vertical section provided with horizontal bearings, a normally horizontal section bodily slidable in a rearward direction on the said bearings, the said horizontal section having a swing frame provided with a pivoted guard to which the forward end of the apron is secured, a supporting and releasing means on the said horizontal section and engaging the said vertical section to normally support the latter in raised position and to allow the said vertical section to drop on the said guard striking an obstacle during the forward movement of the vehicle, means for imparting a swinging movement to the said swing frame during the bodily rearward movement of the horizontal section, and means controlled by the said vertical section and connected with the said swing frame to swing the forward end thereof upward at the time the vertical section moves into lowermost position.

6. A fender, comprising a vertical guideway fixed on the front end of the vehicle on which the fender is used, an apron, an apron frame carrying the said apron, the said apron frame having a vertical section provided with horizontal bearings, a normally horizontal section bodily slidable in a rearward direction on the said bearings, the said horizontal section having a swing frame provided with a pivoted guard to which the forward end of the apron is secured, a supporting and releasing means on the said horizontal section and engaging the said vertical section to normally support the latter in raised position and to allow the said vertical section to drop on the said guard striking an obstacle during the forward movement of the vehicle, means for imparting a swinging movement to the said swing frame during the bodily rearward movement of the horizontal section, toggle levers connecting the said swing frame with the said bearing, and a link pivotally connected with the said toggle levers and having a slotted end engaged by the upper end of the said vertical section.

7. A fender, comprising a vertical guideway fixed on the front end of the vehicle on which the fender is used, an apron, an apron frame carrying the said apron, the said apron frame having a vertical section provided with horizontal bearings, and a section having horizontal rods slidable in the said bearings, a swing frame pivoted on the said rods to swing up and down, catches on the rear ends of the said rods and engaging the said guideway and the said vertical apron section to normally hold the latter in raised position and to release the said vertical apron section and allow it to drop on the front end of the horizontal section striking an obstacle during the forward movement of the vehicle, toggle levers connecting the said bearings with the said swing frame, and a link pivotally connected with the said toggle levers and having a slotted end engaged by the upper end of the said vertical member, rollers on the said swing frame, and inclines on the said bearings and on which are adapted to travel the said rollers.

8. A fender for automobiles and similar power driven vehicles, comprising fixed vertical guideways on the vehicle, an apron, an apron frame carrying the said apron and normally supported in a raised position on the said guideways, the said apron frame having a swing frame normally extending in a horizontal direction and provided at its front end with a normally locked pivoted guard to which the forward end of the apron is attached, means for holding the apron frame normally in raised position and adapted to release the apron frame on the rearward movement of the said swing frame to allow the apron frame to drop, means for imparting a downward swinging motion to the said swing frame during the rearward movement thereof, and means for imparting a return swinging motion to the said swing frame at the time the apron frame drops into lowermost position.

In testimony whereof I have signed my name to this specification in the presence of two subscribing witnesses.

JOHN P. GERAGHTY.

Witnesses:
   Theo. G. Hoster,
   Philip D. Rollhaus.

Copies of this patent may be obtained for five cents each, by addressing the "Commissioner of Patents, Washington, D. C."